United States Patent Office 3,344,218
Patented Sept. 26, 1967

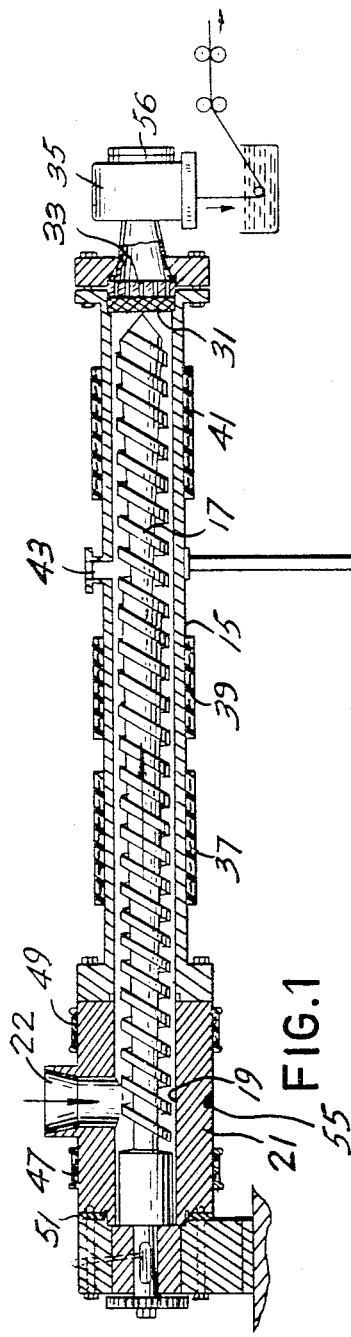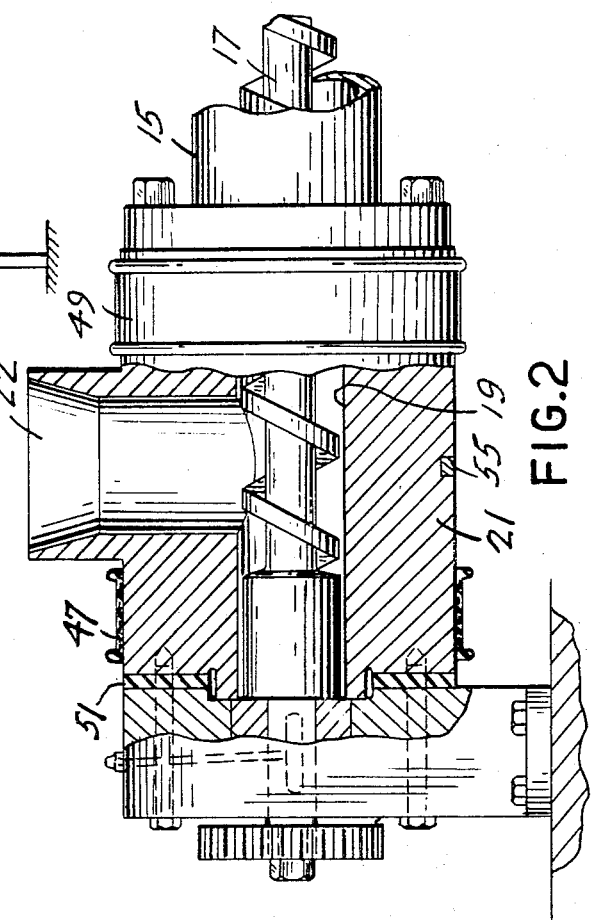

3,344,218
RETREATMENT OF SYNTHETIC FIBRES
Sohinder Nath Chopra and Glen Hugh Guild, Drummondville, Quebec, Canada, assignors to Chemcell Limited, a corporation of Canada
Filed Apr. 26, 1965, Ser. No. 450,761
12 Claims. (Cl. 264—176)

The present invention relates to the recovery of thermoplastic resin waste material resulting from the fibre-making process in the form of a continuous bundle of fibres.

This waste occurs in several forms. One form is bristle, a non-fibrous extrudate which flows from the extruder head. It is an unlubricated, stiff, continuous strap-like material of various sizes. It is difficult to handle and to put on a package and of no commercial value. It varies from fine deniers like yarn to fused lumps. Another form of waste is undrawn yarn in fibrous form which is lubricated and put on packages, but rejected because of sub-quality, package residue, short packages and for other reasons. It may occur as undrawn yarn or as drawn yarn and it may be bulked or unbulked. At the present time this waste yarn is sold to the waste fibre market at a nominal price. Sometimes it may be classified by the denier, degree of bulking, colour or other characteristics. There is usually a better market for white waste than coloured. In any event there is a problem involved in sorting and inventorying in limited quantities. Usually the waste is removed from the package by air stripping or may in some cases be cut off. The non-bulked yarn is very difficult to chop, although the bulked yarn may be chopped more easily. As removed from the package the yarn is of very little value except as waste, and even the waste prices are very low.

Various attempts have been made to handle waste material of the types described to convert it to a more usable form and for re-extrusion. These attempts include chopping the waste bundle, grinding, and mixing with virgin polymer in powder or pellet form to make it more feedable into an extruder. The low density of the polypropylene makes grinding of this material especially difficult and the low bulk density of the fibres make it virtually impossible to feed into the extruder. One of the problems is that the bundle encloses a mass of air which acts as an insulating agent and prevents or limits remelting the material. Vacuum has been tried to remove the air, sometimes mechanical devices in an attempt to feed the material, but none of these methods work satisfactorily.

The present invention, therefore, aims to provide a practical method of handling thermoplastic resin waste and in particular polypropylene waste resulting from fibre making so that the material of the waste can be re-used.

According to the invention, the waste is fed in the form of a continuous bundle of fibres into the receiving end of a plastic extruder. The feed end is heated as well as the remainder of the length of the extruder which is heated to normal extruding temperature. The extruder is provided with a vent preferably somewhat closer to the exit end than to the feed end to allow the escape of gases generated by any lubricant in the feed material. The material, fed through the extruder, is passed through a monofilament die having extruding orifices. The orifices may be circular in cross-section or rectangular or of other forms and of any practical size depending on the output of the extruder. The filaments proceeding from the extruder are passed to a cooling tank and then preferably to a pelletizer, for example, a Whitin. Pellets can be made of any size for reuse in extruding purposes, or for molding.

In conventional extruding, powder or pellets are employed as feed material, and the hopper end of the extruder is cooled to prevent the powder or pellets from bridging up and interrupting the feed. However, according to the present invention, the feed end, surprisingly, is heated. The applicants have found that this permits the extruder to swallow the material rather than rejecting it or pushing it backwards as it does under normal extruding conditions because of the low bulk density. The temperature of the barrel at the feed end should be above the sticking temperature so that the fibres actually stick to the barrel. This may be accomplished by heating the feed casing into which the material is fed.

In order to describe the invention in more detail and in order that it may be understood in more detail, reference will be made to the accompanying drawings illustrating a preferred form of extruder for carrying out the process of the invention, and in which FIGURE 1 is a vertical cross-section through the extruder.

FIGURE 2 is an enlarged fragmentary vertical cross-section of the feed end of the extruder.

Referring more particularly to the drawings, the extruder is generally of the conventional type having an extruding barrel 15 in which there operates an extruding screw 17. One suitable type is the Kilian type, but other types may be used within the spirit of the invention. The feed end of the screw projects from the extruding barrel 15 into a horizontal, elongated chamber 19 of a housing 21 provided with a hopper 22 for receiving the waste plastic material to be extruded. At the outlet end of the barrel 15 is provided a screen 31, a breaker plate 33, and a die 35. Heaters 37, 39 and 41 are shown about the barrel along the length thereof.

According to the present invention, band heaters 47 and 49 are provided about the housing 21 at the feed end and a vent 43 is provided along the barrel closer to the outlet end than to the feed end. Heat insulation is provided as at 51. A thermocouple 55 at the bottom center of the feed section monitors the temperature of the section.

Since the self-feeding action of the screw is being relied on to draw the waste into the barrel and the waste bundle is bulky and irregular, the mouth of the extruder must be extra wide. For example, a mouth size two inches long by one and one-half inches wide directly over the screw is preferred for a one inch extruder. The waste which is in the form of a continuous bundle of fibres may be brought up to the extruder mouth mechanically or by gravity feed. Magnetic separators are preferably employed to remove any ferrous contamination. The operation at this stage is semi-automatic. Since the feed section follows immediately after the extruder bearings, the heat insulation 51 between the feed section and the bearings is necessary. A pad of heat insulating material or a ceramic insulating bushing may be used. An annular water-cooling jacket with continuously running water is considered most efficient for this purpose, i.e. for maintaining the bearings cool relatively to the casing. Since the feed material is very rough and there is risk of contamination as well, the barrel must be made of appropriate material, such as stainless steel of suitable hardness. The length of the barrel may range from 16 to 30 diameters with a preferred range of 20 to 24 diameters.

Since the waste feed carries a lot of entrapped air and may also be contaminated with lubricant, a vented barrel two stage extruder is preferable. The size and location of the vent is dependent on the design of the screw. In one extruder, the vent is of one-half inch diameter at 16 diameters length of the barrel. The vent faces upwards and is open to the atmosphere.

A two stage screw to fit the vented barrel, made with hardened flights of stainless steel is preferred. The first stage of the screw ends just before the vent. The second stage starts from the vent and ends near the screen pack. This screw has a compression ratio in each zone of between 2 to 4, preferably 3 to 3.5, the compression being due to decreasing channel depth or pitch of the screw or both. Larger clearance between the screw and the barrel at the feed section is desirable due to the nature of the feed material. A clearance greater than 0.005 of an inch, preferably between 0.030 to 0.050 of an inch is required.

The screen pack 31 is used at the end of the screw to strain out the solid contaminants from the molten plastic. The screens are supported by a breaker plate. The plastic flowing out of the breaker plate is led to the heated die 33 having heaters 56, the construction of which depends on the nature of the desired product. The orifices may vary in size from fine deniers of hole size, for example, ten thousandths of an inch up to heavier deniers of, for example, two hundred thousandths of an inch. A pressure valve at the extruder end is useful to produce a more uniform product. The material from which the parts of the extruder are made will be understood by anyone skilled in the art, suitable metals, for example, being employed for the barrel 15, the casing 21 and screw 17.

The continuous fibrous material constituting the waste once it is introduced in the form of a continuous bundle of fibres into the feed mouth 22 contacts the metal of the casing 21 and screw 17. The temperature of the casing and screw makes the material tacky and it wraps itself around the screw and is digested into the barrel 15 and forced therethrough by the screw 17. Fibres cut in short lengths do not feed even when the hopper is heated, this being particularly true of lubricated fine denier yarns which are slippery and normally hard to process. The thermoplastic material is further heated by the heaters 37, 39 and 41 as it passes through the barrel 15 and is in the form of a flowable mass when it reaches the screen pack 31 so that it can be readily extruded through the orifices in the electrically heated die 35. The feed having been regularized and with the high compression ratio and pressure control, the extruder output consists of a molten homogenized plastic and is fairly even. Using a suitable die, the output of the extruder may be converted into finished extruded products such as staple fibres, monofilaments or finely divided pellets.

When a plastic material such as polypropylene is subjected to heat and pressure for any length of time as in an extrusion process, a certain amount of material degradation takes place. In the case of polypropylene, the degradation is indicated by the changes in the reduced specific viscosity (RSV) of the waste fibres before and after re-extrusion. RSV is defined and measured by the ASTM method D–1601–58–T. The RSV after re-extrusion would depend on the RSV of the fibre waste, the heat stabilizer used and the re-extrusion set up. A preferred temperature for heating the feed end is to within the range from about 450° F. to about 500° F.

The invention is specially adapted for handling polypropylene waste material but can also be effectively applied to waste from other polyolefins, for example polyethylene or from polyamides, for instance nylon, or other thermoplastic resin waste material in the form of a continuous bundle or continuous bundles of fibres.

The invention will be described in more detail by reference to the accompanying examples illustrating preferred procedures according to the invention.

*Example 1*

In one trial a random mixture of entangled bristle varying from fine yarn to one-quarter inch diameter strands, fused and lumpy at places, was used for re-extrusion. This bristle was free from lubricant or lubricant contaminated yarns. The temperature of the extruder barrel around the hopper was maintained at 400° F., 450° F. at the middle of the extruder and 520° F. at the extruder head and the monofilament die. A one-inch diameter 24:1 L/D screw, with one inch diameter vent at 16D, was used. The output at the extruder end was 15 pounds per hour. The vent was shut in this trial.

The ends of a bunch of bristle were inserted into the extruder mouth by hand. From then on the extruder drew in the waste by its own action. When over-feeding took place, the operator used scissors to cut the excess bristle. The extrudate was spun into monofilaments through a monofilament die. A tank of water was placed under the die with continuously running water while maintaining water level up to one-half inch below the die. The monofilaments were drawn up by means of two draw rolls and then wound on cheeses three and one-quarter inch I.D.

The RSV of the fibre waste was 2.8 before extrusion and 2.5 after extrusion.

*Example 2*

In another trial a random mixture of entangled yarns varying in deniers from 200 to 6000 and 8 to 20 d.p.f., and of various colours and lubricated, were used. The barrel temperature at the feed hopper was 350° F., at the middle of the barrel 450° F. and at the extruder head and die 500° F. The extruder described in Example 1 was used.

The collective ends of a bunch of yarns were inserted into the extruder mouth by hand and the self-feeding started thereafter. The vent was open to the atmosphere. The lubricant fumes and liquid was flowing from the vent mouth which was vertically upwards. The rest of the set-up was as described in Example 1.

The RSV of the fibre waste was 2.50 before extrusion and 2.1 after extrusion.

*Example 3*

In this trial a random mixture of unlubricated fine and coarse bristle together with different lubricated yarns of varying deniers as used in Example 2 were tried on the same extruder and the same set-up as in Examples 1 and 2. The barrel temperatures were the same as in Example 1. The vent of the extruder was left open, vertically upwards. The rest of the details were as in Examples 1 and 2.

We claim:
1. A process for making feed stock for preparing shaped bodies from synthetic thermoplastic resin fibrous waste material, in which the said waste material is passed in the form of a continuous bundle of fibres through an extruder equipped with an elongated extrusion barrel having a feed end and a forming end, the feed end being provided with a casing having a bore concentric with said barrel and a feed hopper leading to said bore, the forming end of the barrel being connected to an extruding head, the barrel being provided with heating means along its length, the process comprising heating the casing to the softening temperature of the feed material whereby the material adheres to the parts in said casing and to the extrusion screw whereby it is swallowed thereby.

2. A process, as defined in claim 1 in which the synthetic thermoplastic resin is selected from the group consisting of polyolefins and polyamides.

3. A process, as defined in claim 1 in which the synthetic thermoplastic resin is polypropylene.

4. A process, as defined in claim 1 in which the synthetic thermoplastic resin is nylon.

5. A process for making feed stock for forming shaped bodies from synthetic thermoplastic resin fibrous waste material by extruding the material in the form of a continuous bundle of fibres through an extruding apparatus, the step comprising heating the intake end of the extruding apparatus to above the softening point of the fibrous waste material whereby the latter adheres to the feed screw and is swallowed by the extruder.

6. A process of treating synthetic thermoplastic resin fibrous waste material to make feed stock for forming shaped bodies, comprising, heating the waste material in the form of a continuous bundle of fibres immediately prior to extrusion to a temperature above which it adheres to the apparatus and then feeding the thus-heated feed stock with further heating to extruding temperature by screw feed under pressure through an extruding passage and thence through a filament-forming head.

7. A process of treating synthetic thermoplastic resin fibrous waste material to make feed stock for forming shaped bodies in which the material is fed through an extruder from a receiving mouth to an extruding head, comprising, feeding the material in the form of a continuous bundle of fibres and heating the material as it is received by the mouth whereby the feed material is softened and adheres to the extruder.

8. A process, as defined in claim 7 in which the synthetic thermoplastic resin is selected from the group consisting of polyolefins and polyamides.

9. A process, as defined in claim 7 in which the synthetic thermoplastic resin is polypropylene.

10. A process, as defined in claim 7 in which the synthetic thermoplastic resin is nylon.

11. A process of recovering fibrous waste, comprising, feeding a mass of fibrous thermoplastic resin waste in the form of a continuous bundle of fibres into a screw feed extruding apparatus into initial contact with a metal housing surrounding the screw while heating the metal housing to a temperature at which the material is adherent to it and to the screw, rotating the screw to force the material through the extruder barrel while heating the extruder to extruding temperature and to force the softened material through filament-forming means.

12. A process comprising feeding thermoplastic resin fibrous waste material in the form of a continuous bundle of fibres to an extruder, heating the material immediately on contact with the extruder to a temperature at which the material is adherent to the screw and while still in the form of a continuous bundle, conveying the material through the extruder while continuing to heat it to form a flowable mass and then extruding the flowable mass into filaments.

References Cited

UNITED STATES PATENTS

| | | | |
|---|---|---|---|
| 1,902,295 | 3/1933 | Shook. | |
| 2,384,521 | 9/1945 | Anderson et al. | |
| 2,549,400 | 4/1951 | Tornberg. | |
| 2,836,851 | 6/1958 | Holt | 264—176 |
| 3,025,565 | 3/1962 | Doriat et al. | 264—176 X |
| 3,035,306 | 5/1962 | Rossiter | 264—176 X |
| 3,055,053 | 9/1962 | Livingston et al. | |
| 3,193,877 | 7/1965 | Edwards | 264—176 |
| 3,238,178 | 3/1966 | Kibler et al. | 264—176 |
| 3,257,173 | 6/1966 | Parnell | 264—176 |

OTHER REFERENCES

"Plastics Extrusion Technology," by A. L. Griff, p. 163, Reinhold Publishing Corp., 1962.

ALEXANDER H. BRODMERKEL, *Primary Examiner.*

J. H. WOO, *Assistant Examiner.*